April 22, 1969         A. C. ANSELM         3,440,129
DECORATIVE PLASTIC EXTRUSIONS
Filed June 14, 1965
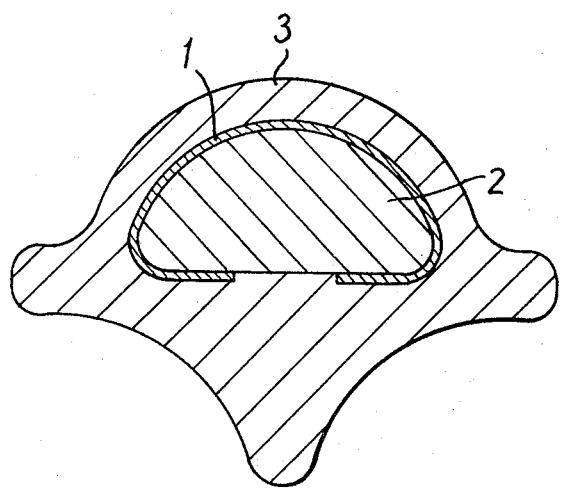
Inventor
A.C. ANSELM
By
Holcombe, Wetherill & Brisebois
Attorney 3,440,129
DECORATIVE PLASTIC EXTRUSIONS
Anthony Cesar Anselm, Weybridge, England, assignor to Creators Limited, Surrey, England, a British company
Filed June 14, 1965, Ser. No. 463,744
Claims priority, application Great Britain, June 16, 1964, 24,927/64
Int. Cl. B32b *31/30, 11/08*
U.S. Cl. 161—5      5 Claims The present invention relates to a decorative plastic extrusion comprising a transparent or translucent plastic material within which is embedded a metal foil or layer, the metal foil or layer being visible through the extrusion to produce a decorative effect. The extrusions thus produced may be used as edge trimmings on motor-car bodies, as filler strips in rubber surrounds for motor car or other windows, and for other purposes for which, for example, chromium plated strips may be normally used. That face of the extrusion through which the metal foil or layer is intended to be viewed when the decorative extrusion is in use is herein referred to as the "front face."

British Patent No. 857,814 describes a decorative plastic extrusion in which, for the purpose of protecting the metal foil or layer from tarnishing or corroding, the metal layer is applied in close surface contact on the surface of a strip of transparent or translucent plastic foil which is embedded in the extrusion with the plastic foil facing the front face of the extrusion, whereby that surface of the metal layer which is applied against the foil is seen through the front face of the extrusion, said plastic foils having retained its foil form and not having broken down under the heating to which it has been submitted during extrusion.

By applying the metal layer in close surface contact with the plastic foil, the surface of the metal layer which is seen through the front face of the extrusion is protected from air or moisture, whereby tarnishing and corrosion of this surface is reduced. Preferably the metal layer is laminated between two strips of plastic foil so that both surfaces of the metal layer are protected.

The metal layer may comprise a strip of metal foil, or may be formed by spraying or vacuum-depositing a metal coating on to the surface of foil. Such metal coated plastic foils and composite metal and plastic foils, whether the metal is applied against a single plastic foil or laminated between two layers of plastic foil, are hereinafter generally referred to as "metal-plastic foil laminates" or as "foil laminates."

The present invention provides an improvement in the invention described in the aforesaid specification and consists in bonding the metal-plastic foil laminate to the surface of an extruded plastic core of a desired cross section, and incorporating the core with the foil laminate bonded thereto as an insert in an extrusion of transparent or translucent plastic material, which forms a protective layer over the decorative foil laminate which is seen through the front face of the decorative plastic extrusion.

By means of the construction according to the invention, the metal-plastic foil laminate is held rigidly at the desired shape by the extruded plastic core during the extrusion of the transparent or translucent plastic therearound. This construction also eliminates or reduces crinkling of the metal layer when the decorative extrusion is bent. It also enables the cost of the extrusion to be reduced because the plastic core can be made of much cheaper grade of material than the high grade material used for the transparent or translucent layer covering the metal-plastic foil laminate. The plastic core may have a cross-section with a curved surface, for example semi-circular, which surface may correspond with the curvature of the front face of the finished decorative plastic extrusion to produce a lens effect.

The accompanying drawing shows a section through a decorative extrusion constructed according to the invention. The metal-plastic foil laminate 1 is bonded to the surface of a core 2 extruded of a plastics material. The core 2 with the foil laminate 1 bonded thereto is encapsulated in a transparent plastics material 3 by extruding the transparent plastics material therearound. The composite decorative extrusion shown has a cross-sectional shape which makes it suitable for use as a filler strip in a rubber surround for motor car windscreens, but, of course, other cross-sectional shapes are possible depending upon the purpose for which the decorative extrusion is to be used.

In a preferred embodiment, the metal-plastic foil laminate 1 comprises strip of polyester film, such as "MYLAR", having one surface metallised, e.g. with aluminium, and having its metallised surface laminated to a thin layer of polyvinyl chloride. The foil laminate has its P.V.C. layer bonded to the surface of the extruded plastic core 2, which may also be made of P.V.C. and need not be transparent. The layer 3 is extruded from crystal clear polyvinyl chloride.

The metal-plastic foil laminate 1 may be bonded to the core 2 while the latter is being extruded, and the core with the foil laminate bonded thereto may be directly fed through the crosshead of a machine extruding the transparent material 3, whereby the composite decorative strip is made in a continuous operation.

What I claim is:
1. A decorative plastic extrusion comprising an extruded plastic core, a metal-plastic foil laminate bonded to the surface of said core, said core with the foil laminate bonded thereto forming an insert in an extrusion of transparent or translucent plastic material which forms a protective layer over the foil laminate which is seen through the front face of the decorative plastic extrusion.

2. A decorative plastic extrusion as claimed in claim 1, wherein the plastic core has a cross-section with a curved surface over which the metal-plastic foil laminate is bonded, and the front face of the decorative plastic extrusion has a similar curvature.

3. A decorative plastic extrusion as claimed in claim 1, wherein the metal-plastic foil laminate comprises a strip of transparent polyester film having one surface metallised, and having its metallised surface laminated to a thin layer of polyvinyl chloride, said polyvinyl chloride layer of the foil laminate being bonded to the surface of the plastic core.

4. A decorative plastic extrusion as claimed in claim 1, wherein the plastic core which is extruded is polyvinyl chloride.

5. A decorative plastic extrusion as claimed in claim 1, wherein the protective layer which is extruded is crystal clear polyvinyl chloride.

References Cited

UNITED STATES PATENTS

| | | | |
|---|---|---|---|
| 3,015,133 | 1/1962 | Nichols | 264—173 |
| 3,024,147 | 3/1962 | Brooks et al. | 156—244 X |
| 3,086,216 | 4/1963 | Brooks et al. | 2—278 |
| 3,013,919 | 12/1961 | Bialy | 156—244 X |
| 3,188,256 | 6/1965 | Shoemaker | 156—244 |

JACOB H. STEINBERG, *Primary Examiner.*

U.S. Cl. X.R.

156—244; 161—103; 264—174; 296—31